J. EGGERS & P. THOMSEN.
MARINE WATER TUBE BOILER AND SUPERHEATER.
APPLICATION FILED JUNE 2, 1915.
1,179,412.  Patented Apr. 18, 1916.
5 SHEETS—SHEET 5.
Fig. 7.
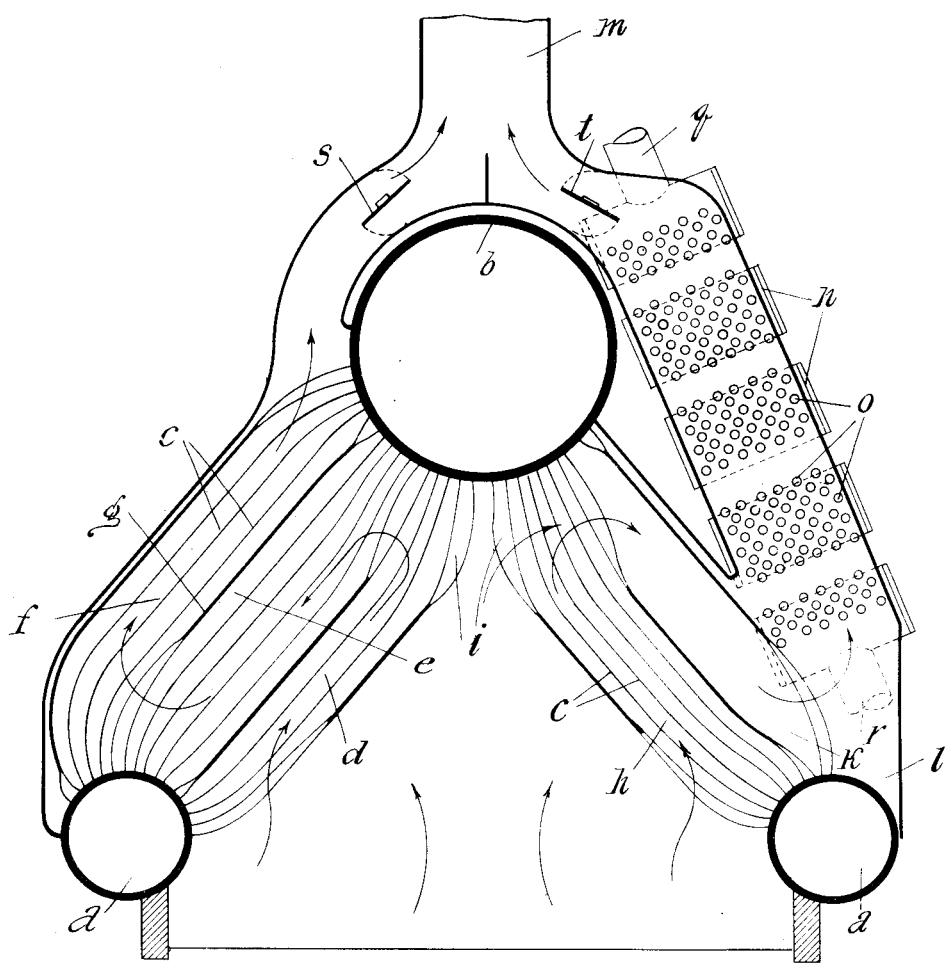
WITNESSES
George Du Bon
INVENTORS
JULIUS EGGERS
PETER THOMSEN
BY
ATTORNEYS

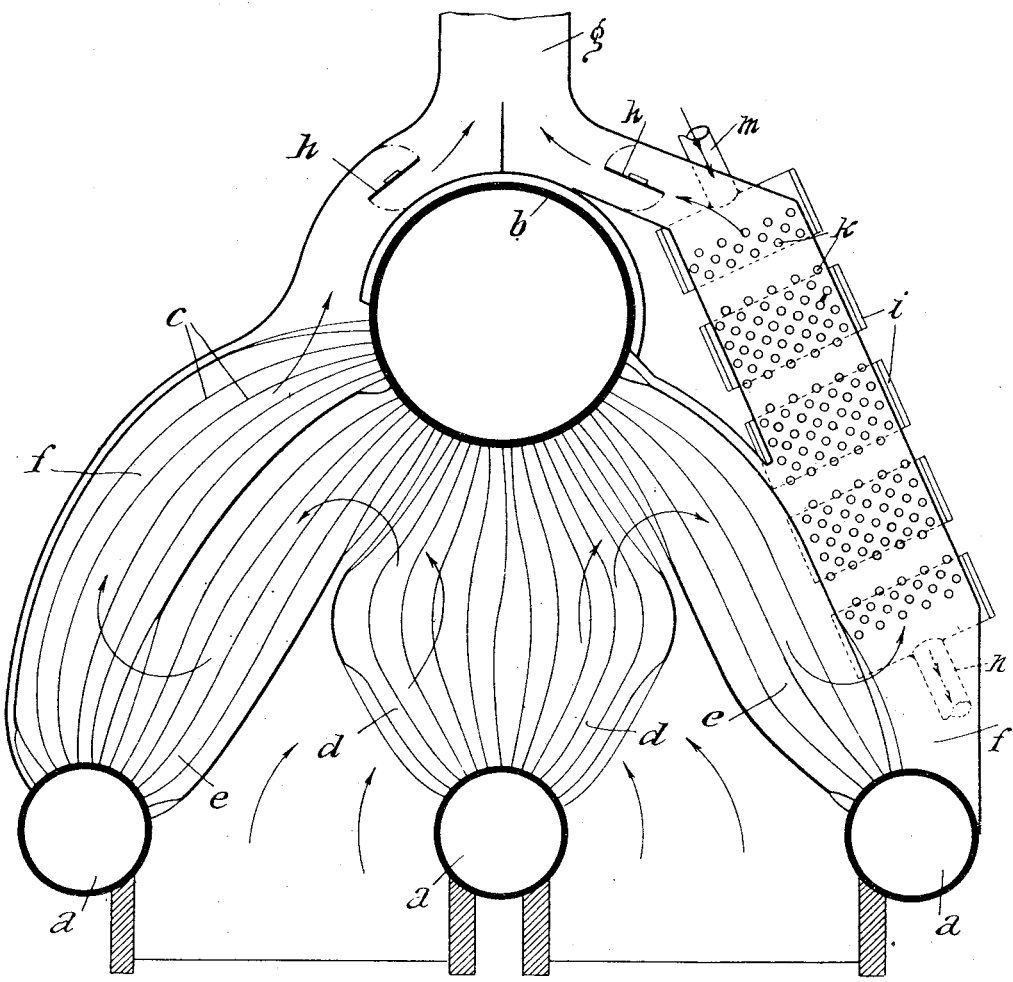

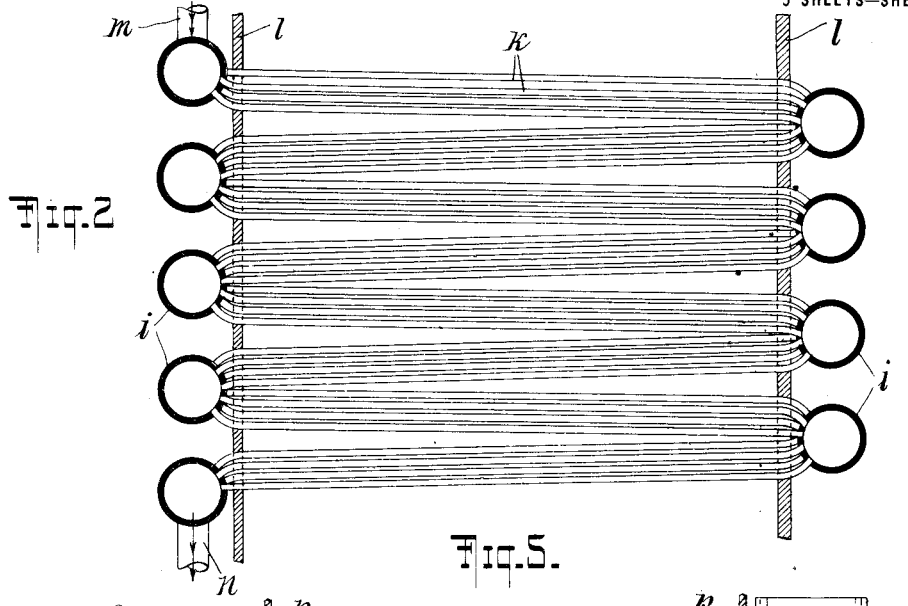
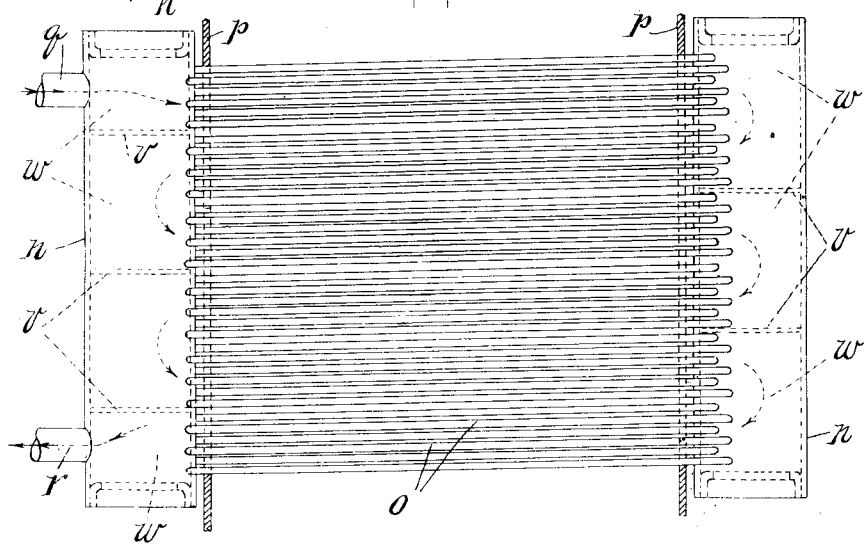
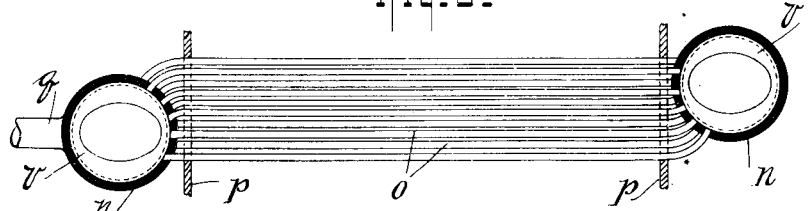

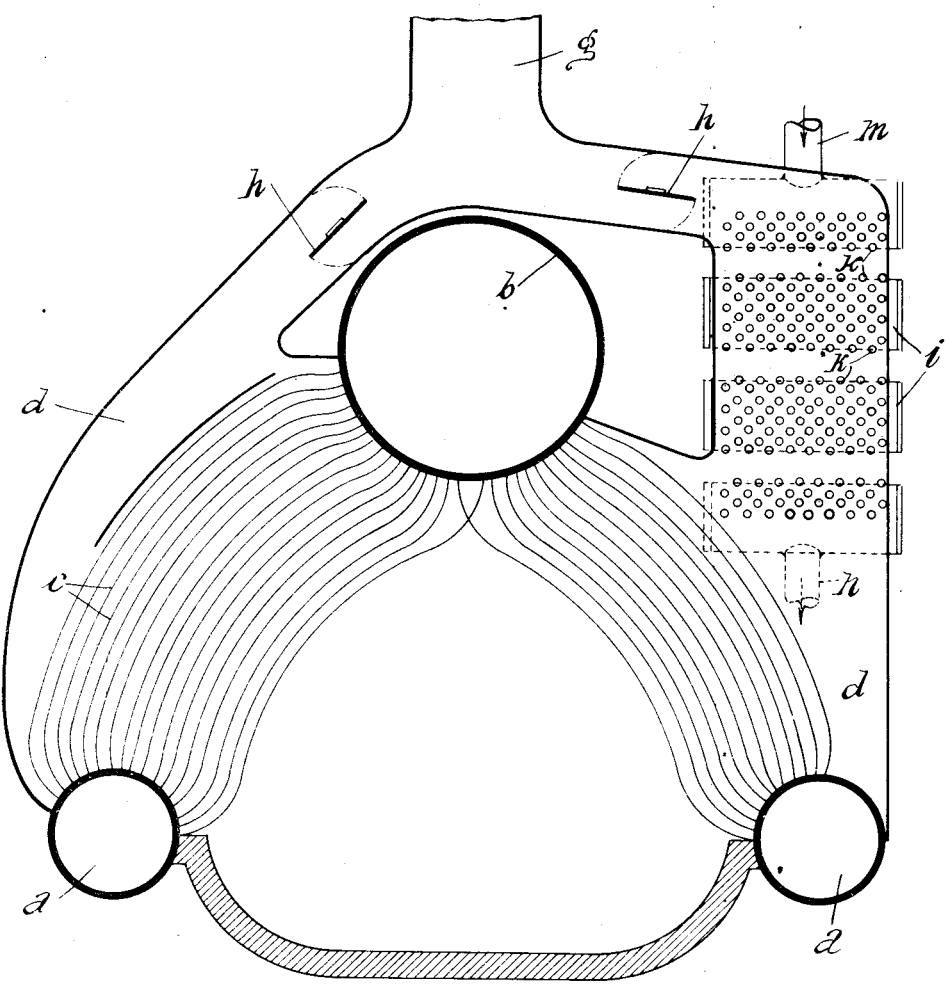

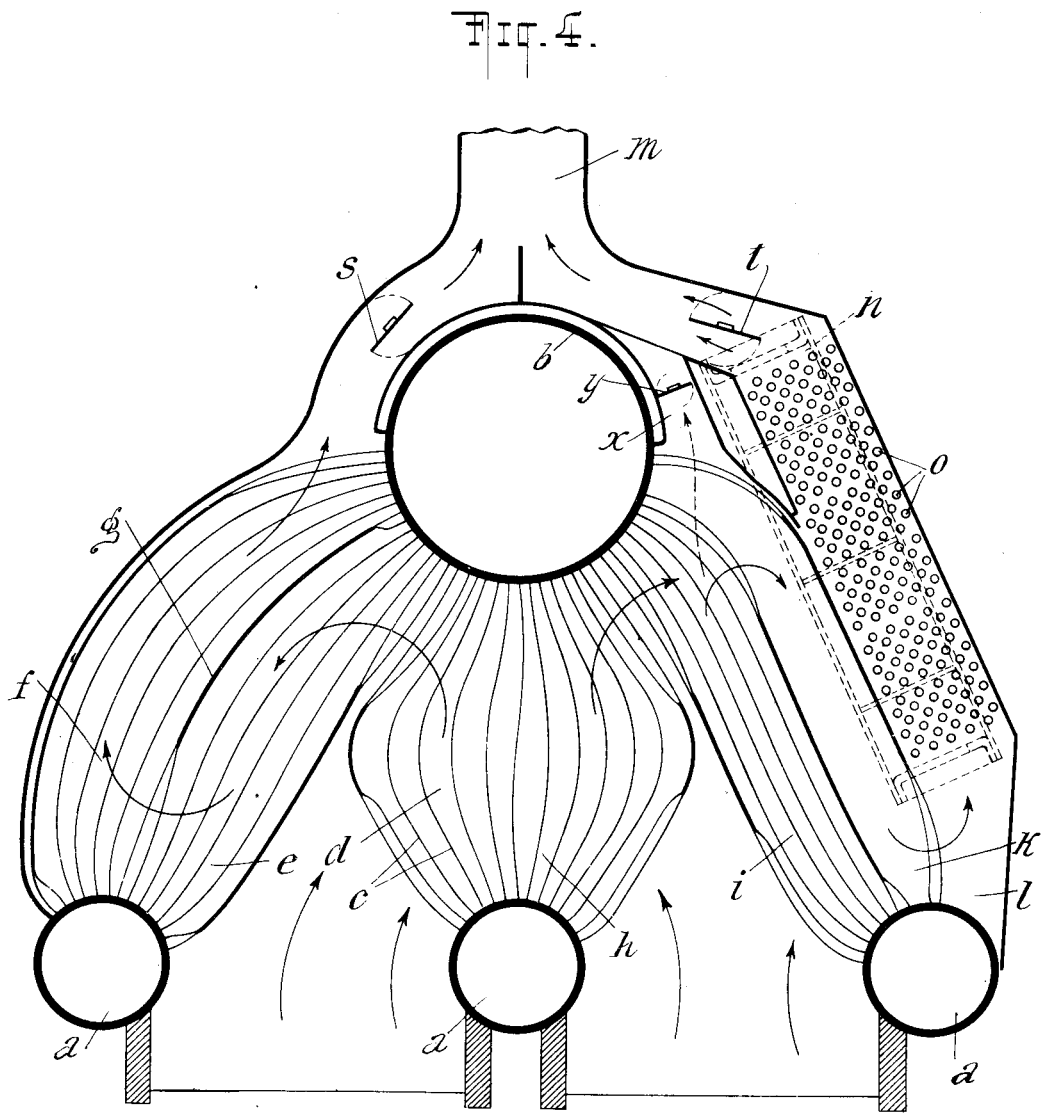

UNITED STATES PATENT OFFICE.

JULIUS EGGERS AND PETER THOMSEN, OF CASSEL-WILHELMSHÖHE, GERMANY, ASSIGNORS TO SCHMIDT'SCHE HEISSDAMPF-GESELLSCHAFT M. B. H., OF CASSEL-WILHELMSHÖHE, GERMANY, A CORPORATION OF GERMANY.

MARINE WATER-TUBE BOILER AND SUPERHEATER.

1,179,412.    Specification of Letters Patent.    Patented Apr. 18, 1916.

Application filed June 2, 1915. Serial No. 31,795.

*To all whom it may concern:*

Be it known that we, JULIUS EGGERS and PETER THOMSEN, both citizens of the Empire of Germany, residing at Cassel-Wilhelmshöhe, Germany, have invented certain new and useful Improvements in Marine Water-Tube Boilers and Superheaters, of which the following is a specification.

Our invention relates to a marine water tube boiler provided with a superheater and particularly to such a boiler provided with a laterally disposed superheater comprising distributing and collecting headers united by tubes substantially parallel with the length of the boiler.

It is the object of our invention to provide a new and improved water tube boiler with a superheater of the class referred to in which the superheater tubes shall be more accessible for cleaning purposes than hitherto and in which, further, all pockets capable of catching and holding water and air shall be avoided.

Other objects will appear as the specification proceeds.

Our invention provides a novel and very convenient arrangement of water tube boiler and superheater for marine purposes.

More particularly our invention comprises a marine boiler and superheater of the class described in which the superheating tubes are slightly inclined and connected in series by means of a plurality of distributing and collecting headers.

In the prior art, superheaters of the general class referred to have had the disadvantage that the superheating tubes proper could be cleaned only with difficulty and, even then, but imperfectly. When the headers have a rather considerable length, as they almost invariably have, they must also have a very considerable diameter in order that the necessary cleaning tools may be introduced therein so as to reach the mouths of the superheating tubes; this same necessity obtains in the construction of the superheater in connection with the introduction of the necessary tools for beading the tube ends into the headers. In our invention, the headers are given a relatively inconsiderable length so that, even when their diameter is so small that they cannot be easily entered, one can still introduce suitable cleaning and beading apparatus by merely opening the usual manhole at the end of the header; the tube ends can then be reached by hand.

A further advantage of our invention, as contrasted with known arrangements of the same class, resides in the fact that the superheating tubes have a slight descent or slope from one header to the next so that the steam flows through the individual headers, one after another; thus any water collects at the lowest point while air can rise and collect at the highest point. In this way the air and steam can readily be drawn off from the collectors, thus avoiding early rusting of the apparatus and prolonging its life.

We find that a very convenient form of our inventive idea resides in placing a plurality or group of headers outside of the front end wall of the boiler and a similar group of headers outside of the rear end wall, with the members of the two groups slightly displaced as to one another and suitably connected by superheating tubes. With such an arrangement the superheating tubes may be ordinary or only slightly curved tubes which can be traversed by cleaning tools from either end. The headers may be either vertical or horizontal or slightly inclined either with the vertical or horizontal. They are preferably slightly displaced vertically with reference to one another in order, on the one hand, to obtain the desired slope, and on the other hand, to utilize the entire length of the headers for superheater tubes.

The vertical or nearly vertical arrangement may be constructed with the headers at each end arranged axially in line with one another and so as to constitute a combined housing with removable partitions; this housing lies in a direction parallel with that of the flow of fire gases across the superheater tubes. The partition walls may, as stated, be made removable and are preferably provided with holes so that water may fall to the lowest chamber of the header and air rise to the uppermost chamber of the header. This vertical arrangement affords the advantage that the connecting or superheating tubes may be inserted into the headers radially without the formation of water pockets or air pockets.

In the arrangement having headers slightly inclined to the vertical it is very important that the superheating tubes connected to the one header at the lowest points and to the other header at the highest points shall not be bent, but on the contrary should be straight; this precludes the formation of water pockets at the said lowest points of the one header and the formation of air pockets at the said highest points of the other headers.

Our invention will be better understood by referring to the accompanying diagrammatic drawings showing several embodiments thereof.

In the drawings Figure 1 is a cross section through a marine water tube boiler with superheater according to our invention and Fig. 2 a side elevation part section thereof; Fig. 3 is a cross section through a modified form of our invention showing a boiler intended to be fired by oil; Figs. 4 to 6 inclusive, show another embodiment of our invention, Fig. 4 being a cross section through the boiler and superheater; Fig. 5 the superheater in side elevation, and Fig. 6 a plan view of the superheater; Fig. 7 is a cross section of another embodiment of my invention.

In the form shown in Figs. 1 and 2, the boiler proper comprises three bottom cylindrical shells $a$ and a similar top shell $b$, the latter being connected to the former by groups of suitably disposed water tubes $c$. Flues are provided in the several groups, in the well known way, by arranging a number of the water tubes closely together so as to constitute partition walls; the central group has two up flues $d$ each having an outside partition wall $d'$, as described, but no central separating wall. Each flue $d$ connects with a down flue $e$ and an up flue $f$ of the outer group, and the flues $f$ connect with a common central chimney $g$ provided with regulating valves $h$. The flue $f$ of the right hand group of water tubes contains the superheater. This is of the same general construction as the boiler proper, i. e., it comprises cylindrical headers or collectors $i$ united by tubes $k$; the headers $i$ are arranged on the outside of the boiler walls $l$ with their axes, which in the embodiment shown, are slightly inclined to the horizontal, perpendicular to the plane of the axes of the upper and of the lower right hand boiler shells. The headers $i$ at one end of the boiler are, furthermore, slightly displaced vertically with respect to the headers at the other end of the boiler so that the superheating tubes $k$, which are arranged between the opposite headers $i$ so that steam flows through all the headers in series, have a slight slope. The tubes $k$ are perfectly straight from end to end, except for a slight bend where they enter the headers. Wet steam is admitted to the top header $i$ through a pipe connection $m$ and flows through the superheater in an opposite direction to the flow of the hot gases. The superheated steam is drawn from the bottom header $i$ through a pipe connection $n$. On account of the slope of the tubes $k$ and the character of their bends where they enter the headers, water and possible impurities will pass into the lowest header where they may be separated in any suitable manner; air, on the other hand, escapes upwardly into the top header. In the position shown for the valves $h$ the hot gases of the right hand part of the boiler pass upwardly through the flue $d$, downwardly through the connecting flue $e$ and thence upwardly through the flue $f$ which contains the superheater, thereby superheating the steam. The degree of superheat may be regulated by the valves $h$. If the right hand valve $h$ is completely closed then the superheater will be entirely cut out and the hot gases of the right hand grate will pass through the flue $d$ on the left hand side so as to unite with the gases of this side. If on the other hand the left hand valve $h$ is closed then the hot gases of the left hand grate will pass through the flue $d$ toward the right hand half of the boiler in order to unite with the gases of such side. In this case one will obtain a very high degree of superheat such as is desired for short spurts; in the arrangement shown, this superheating is obtained very efficiently since the hot gases of the left hand grate, with the corresponding left hand valve $h$ closed, will only have to pass through the first flue $d$ of this group; they are therefore but little cooled and reach the superheater with a large number of heat units.

Fig. 3 illustrates an embodiment of our invention arranged for oil burning which comprises two cylindrical boilers $a$ joined to a similar top boiler $b$ by two groups of water tubes $c$. The direction of the hot gases is across these two groups of tubes and up through the lateral flues $d$ to a common chimney $g$. A regulating valve $h$ controls each flue $d$ and the right hand flue $d$ contains the superheater. This superheater is made similarly to that of Figs. 1 and 2 and positioned within the boiler, except that the headers $i$ are completely horizontal instead of being inclined thereto.

In the modification shown in Figs. 4 to 6, the boiler proper, as in Figs. 1 and 2, comprises three cylindrical bottom shells united to a similar upper shell $b$ by groups of water tubes $c$. The left hand half of the boiler has an up flue $d$ through which the hot gases of the left hand group flow over about half of the tubes of the central group, and then through a down flue $e$ and an up flue $f$ separated from one another by a tube wall $g$. This arrangement of the flues on the left hand side of the boiler may, however, be modified or changed. The right hand side of the boiler has two up flues $h$ and *i* which are connected with flue *d* (since the usual central separating partition is lacking in the middle group of water tubes) on the one hand, and, on the other hand, with a down flue *k*. This flue *k* contains no water tubes whatever, disregarding those of the partition walls which bound it laterally, so that the collective heating surfaces of this side of the boiler are all disposed in front of flue *k*. An up flue *l*, connecting with flue *k*, contains a superheater and joins flue *f*, of the left hand side of the boiler, in the common chimney *m*. Between the superheater and the top boiler *b* there is also provided a flue, controlled by regulating valve *y*; this flue connects the chimney *m* with the heating flues on the right hand side of the boiler. The superheater may be of any usual design; as shown in the embodiment herein described, its construction is similar to that of the boiler proper and comprises two cylindrical headers *n* joined by substantially straight tubes *o*. Each header is disposed on the outside of the boiler casing *p* with its axis, which is slightly inclined to the vertical, lying in a plane parallel with the plane of the axes of the adjacent bottom and top boiler shells *a* and *b* but at right angles to the axes of said shells; the headers are, therefore, entirely outside of the path of the hot gases. The two headers are displaced with reference to one another, both laterally and vertically by a small amount, and each is sub-divided by partitions *v* into a plurality of chambers *w* in such a way that the tubes *o* which connect the chambers of opposite headers with one another are parallel but slightly inclined and the steam flows from chamber to chamber of opposite headers alternately through the tubes in series. The mode of connecting the tubes to the headers is of special importance. If the usual arrangement of having each tube more or less bent, as it enters the header, is adopted, water traps will be established at the lowest junction points of the tubes with the one header and air traps at the highest junction points of the tubes with the other header, by reason of the inclination of the headers with respect to the vertical. For this reason the tubes *o* are perfectly straight at these junction points *i. e.*, they enter the headers without bending (Fig. 6). Water can therefore, flow from the left hand chamber through the tubes *o* toward the right hand chamber while air can rise with equal ease. The mixture of the two media which does not pass off in the manner indicated can be easily drawn off since the partition walls *v* of the headers are provided with openings. The headers are preferably of such diameter that by removing the usual manhole cover, and the light and easily separable partition walls *v*, they can be completely traversed or explored. Wet steam is admitted into the upper chamber *w* of the left hand collector *n* through a pipe connection *q* and flows alternately through the chambers of the two headers one after the other in a direction opposite to that of the hot gases. The superheated steam may be drawn off from the lowest chamber *w* of the left hand header *n* by means of a pipe connection *r*. The two flues *f* and *l* are provided respectively, just before they unite in the common chimney, with valves *s* and *t* by means of which the degree of superheating may be regulated. If the right hand valve *t* and valve *y* of passage *x* be closed, the superheater will be entirely cut out and the hot gases of the superheating side of the boiler will pass through the other half of the boiler into the chimney. If, on the other hand, the left hand damper *s* is closed and damper *t* opened, then the left hand outer bundle of water tubes will be cut out and the hot gases of the left hand grate will all pass through the center group of water tubes and combine with the hot gases of the right hand group so as to pass through the right hand side of the boiler and over the superheater tubes. If, on the other hand, the damper *t* is closed and the damper *y* of passage *x* is opened, then the superheater will again be entirely cut out since the hot gases of the superheating side will substantially all pass through the passage *x* directly into the chimney, after they have passed over the collective heating surfaces of the two parallel flues *h* and *i*, while the remainder of the hot gases will unite with the hot gases on the left hand side of the boiler. The headers *n* may be either completely vertical or slightly inclined in the length of the boiler, or inclined both in the length of the boiler and toward the boiler. In the first two cases it is possible to connect the tube ends radially into the headers without any formation of water and air traps. In the last case the arrangement of Fig. 6 must be adopted to avoid such traps.

Fig. 7 shows a boiler comprising bottom cylinders *a* and a top cylinder *b* joined as usual to the bottom cylinders by water tubes *c*. In the left hand half of the boiler the gases pass from the grate through an up flue *d*, a down flue *e* and an up flue *f* formed in the usual way by closely laid water tubes. In the right hand side of the boiler an up flue *h*, containing all of the water tubes of this side of the boiler, takes the hot gases from the grate. This flue *h* is connected at its upper end on one side with the flue *d*, of the left hand side of the boiler, through inlet openings *i* (which may be covered below) and on the other side is connected with a down flue *h* which is completely free of water tubes, disregarding those which comprise the bounding walls of the flue. An up flue $l$ is behind and connected with flue $k$ and contains the superheater, which may be of any convenient construction; as represented, it is substantially the same as the construction shown in Figs. 1 and 2 so that any further explanation may be dispensed with. Other features are substantially the same as in Fig. 4 except that there is no gas outlet passage between superheater and top boiler cylinder. With the damper $t$ of the superheater flue $l$ completely closed, the superheater is cut out and the hot gases pass from the grate through the up flues $d$ and $h$, uniting through openings $i$, and then pass through flues $e$ and $f$ into the chimney $m$. If valve $s$ be closed, on the other hand, only the water tubes in the flue $d$, in the left half of the boiler, will be passed over by hot gases which will unite through the openings $i$ with the remaining fire gases ascending through flue $h$.

Our invention is obviously not limited to the particular embodiments shown and described herein. Thus the several cylinders or headers of the boiler proper and of the superheater, while preferably cylindrical, need not necessarily be so but may have any desired or usual form. Similarly the superheater may be arranged behind the water tubes on both sides of the boiler. Nor is the arrangement of heating flues and the location of the superheater with respect to the boiler dependent upon any particular construction or design of superheater. If desired, a feed water heater or an air pre-heater may be arranged over the superheater in any of the modifications shown on either or both sides of the boiler; or a feed water heater may be placed on one side and an air pre-heater on the other. Such a feed water heater or air pre-heater may have any usual construction or may be constructed similarly to the superheater. And, lastly, the gas passage or outlet between superheater and boiler cylinder may be omitted, if desired, within the scope of our invention.

Having described our invention, we claim:

1. In a marine boiler, a laterally disposed superheater comprising two groups of distributing and collecting headers respectively, at least one of said groups being outside of the boiler casing, and groups of inclined tubes running lengthwise of the boiler between the header groups so as to form a set of series connected groups of tubes.

2. In a marine boiler, a laterally disposed superheater comprising two groups of distributing and collecting headers respectively at opposite ends of the boiler outside the boiler casing, the members of one group being displaced with reference to the members of the other group, and groups of inclined tubes running lengthwise of the boiler between the header groups so as to form a set of series connected groups of tubes.

3. In a marine boiler, a laterally disposed superheater comprising two groups of distributing and collecting headers respectively, at least one of such groups being outside of the boiler casing, connected by groups of inclined tubes running lengthwise of the boiler so as to form a set of series connected tubes, the headers of each header group being arranged axially in line so as to constitute a common housing with removable partition walls said axial direction being parallel to the flow of fire gases over the inclined tubes.

4. In a marine boiler, a laterally disposed superheater comprising a group of headers at each end of the boiler, at least one group being outside of the boiler casing, groups of inclined tubes joining members of the two groups of headers alternately so as to form a set of serially arranged tubes, the header groups being inclined vertically and relatively displaced and the inclined tubes having straight ends when they enter the lowest points on one header and the highest points on the other header.

In testimony whereof we have hereunto set our hands in the presence of two subscribing witnesses.

JULIUS EGGERS.
PETER THOMSEN.

Witnesses:
JULIUS FRANKE,
CARL MOLL.